United States Patent [19]

Powers

[11] Patent Number: 4,981,175

[45] Date of Patent: Jan. 1, 1991

[54] RECIRCULATING GAS SEPARATOR FOR ELECTRIC SUBMERSIBLE PUMPS

[75] Inventor: Maston L. Powers, Oklahoma City, Okla.

[73] Assignee: Conoco Inc, Ponca City, Okla.

[21] Appl. No.: 462,667

[22] Filed: Jan. 9, 1990

[51] Int. Cl.$^5$ .................. E21B 43/38; E21B 43/40
[52] U.S. Cl. ................................ 166/265; 55/203; 55/406; 166/105.5
[58] Field of Search .............. 166/105.5, 105.6, 265; 55/203, 406, 199, 201, 202, 401, 400

[56] References Cited

U.S. PATENT DOCUMENTS

| | | | |
|---|---|---|---|
| 2,285,169 | 6/1942 | Pyle | 166/105.5 |
| 2,311,963 | 2/1943 | Pyle | 166/105.5 X |
| 2,525,233 | 10/1950 | Miller | 183/2.7 |
| 3,624,822 | 11/1971 | Carle et al. | 166/105.5 X |
| 3,887,342 | 6/1975 | Bunnelle | 55/203 |
| 4,088,459 | 5/1978 | Tuzson | 166/105.5 X |
| 4,231,767 | 11/1980 | Acker | 166/105.5 X |
| 4,330,306 | 5/1982 | Salant | 166/105.5 X |
| 4,481,020 | 11/1984 | Lee et al. | 55/203 |
| 4,676,308 | 6/1987 | Chow et al. | 166/369 |
| 4,766,957 | 8/1988 | McIntyre | 166/265 |

OTHER PUBLICATIONS

Journal of Petroleum Technology, Jun. 1982, "Gas Separator Performance for Submersible Pump Operation", Lea and Bearden.
Standing, M. B.: Oilfield Hydrocarbon Systems, Reinhold Publishing Corp., New York City (1952).
API RP 14E, API Recommended Practice for Design and Installation of Offshore Production Platform Piping Systems, 4th Edition, API (Apr. 15, 1984), p. 22, paragraph 2.5(a).

*Primary Examiner*—Hoang C. Dang
*Attorney, Agent, or Firm*—A. Joe Reinert

[57] ABSTRACT

A recirculating gas separator for a submersible well pump includes a rotary gas separator for separating liquid to be directed to the pump from a gas. The separator includes a separating chamber, a well fluid inlet upstream of the separating chamber, and a liquid discharge outlet downstream of the separating chamber. A recirculating system recirculates a portion of the liquid discharged from the discharge outlet back to the separating chamber so that a gas-to-liquid ratio in the separator is substantially lower than a gas-to-liquid ratio of well fluid entering the well fluid inlet. Thus, the submersible well pump with the recirculating gas separator can successfully pump wells having substantially higher gas-to-liquid ratios than can be accomplished with prior devices.

24 Claims, 4 Drawing Sheets

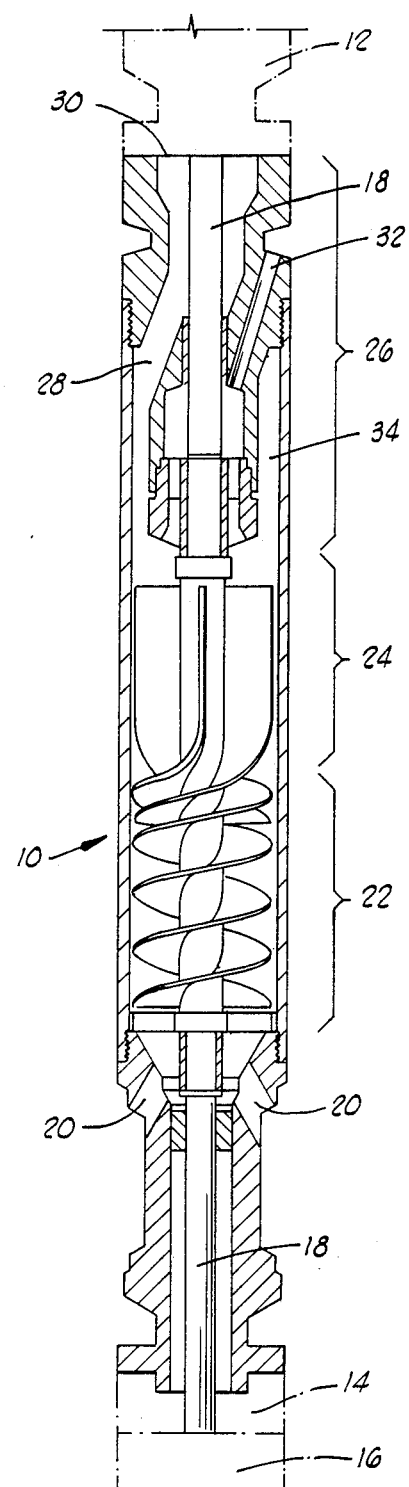
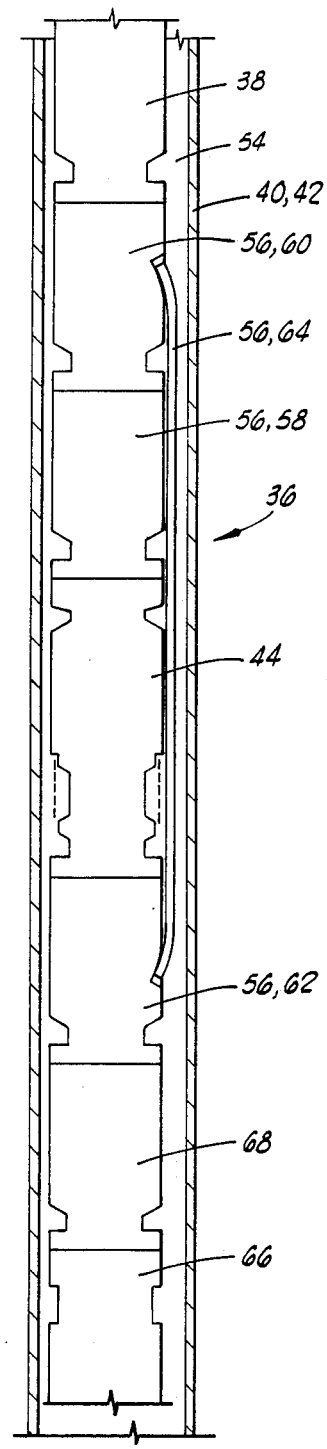
FIG. 1 (PRIOR ART)
FIG. 2

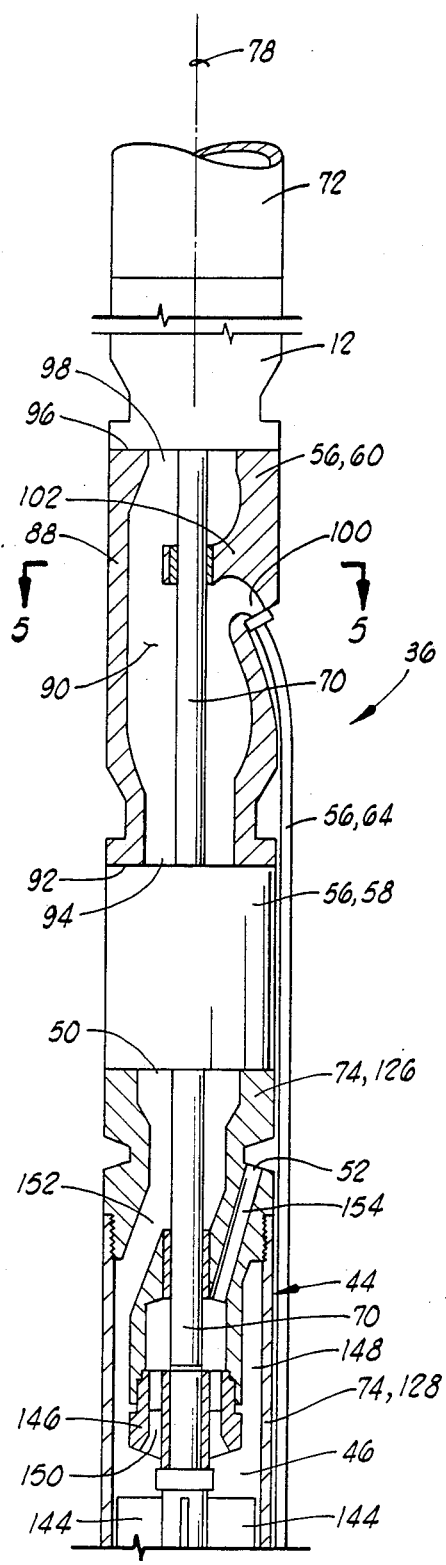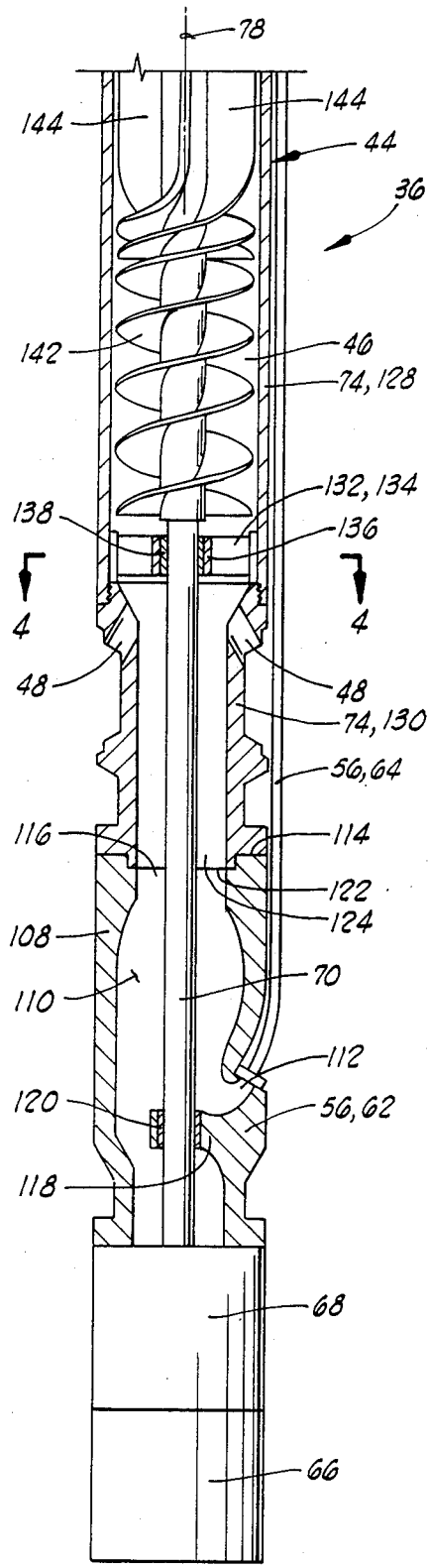

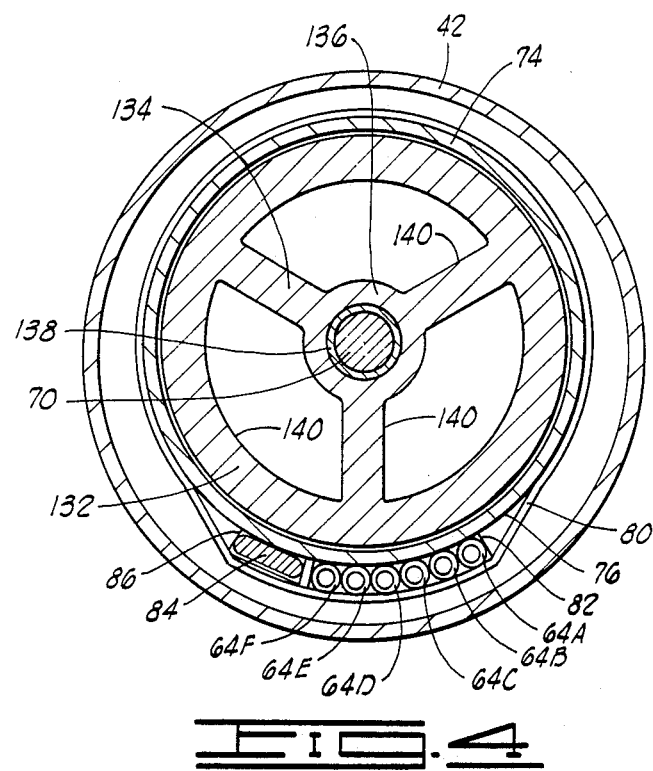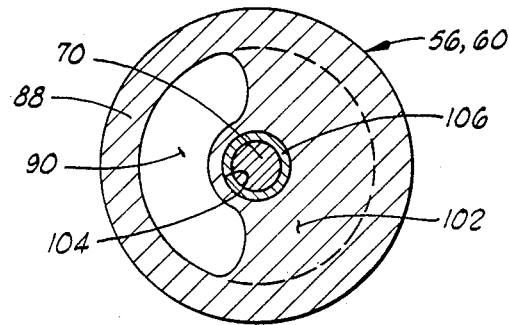

(HEAD VS. RATE CURVES OF MAIN AND RECIRCULATING PUMPS)

(RECIRCULATING PUMP HEAD VS. RATE CURVE AND CONDUIT HEAD LOSS CURVE)

RECIRCULATING GAS SEPARATOR FOR ELECTRIC SUBMERSIBLE PUMPS

BACKGROUND OF THE INVENTION

1. Field of the Invention

The present invention relates generally to the production of liquids from wells, and more particularly to gas separators for separating gas from a well fluid before the well fluid is pumped by a submersible well pump.

2. Description of the Prior Art

One difficulty encountered with submersible well pumps is that if the fluid being pumped contains an excessive amount of gas, the pump performance will deteriorate and ultimately a gas lock will occur which completely stops the pump from pumping. Early attempts at resolving this problem included reverse flow type gas separators such as that shown in U.S. Pat. No. 2,525,233 to Miller.

A somewhat similar, more recent device is shown in U.S. Pat. No. 4,676,308 to Chow et al.

In recent years various manufacturers of electric submersible pumps have developed rotary gas separators which have expanded the applicability of electric submersible pumps to include wells which produce sufficiently large volumes of gas to render them unpumpable using earlier technology such as reverse flow type gas separators.

A typical state of the art electric submersible pump rotary gas separator is illustrated in U.S. Pat. No. 4,481,020 to Lee et al. The gas separator of Lee et al. includes a charging mechanism which initiates axial flow, a separation chamber in which a high energy vortex is developed, and a flow diverting chamber which routes the centrifuged liquids from the perimeter of the separator into the eye of the first stage of the submersible well pump and routes the separated gas from the central area of the separator to exit ports through which it is vented into a well casing annulus.

Another typical such centrifugal gas separator is shown in U.S. Pat. No. 3,887,342 to Bunnelle.

An article in the *Journal of Petroleum Technology*, June, 1982, entitled "Gas Separator Performance for Submersible Pump Operation" by Lea and Bearden demonstrates that rotary gas separators are capable of removing essentially all gas from flow streams that contain up to about 30% gas by volume at pump suction conditions. Field experience has shown that electric submersible pumps equipped with rotary gas separators can be operated dependably on flow streams containing up to approximately 65% gas by volume at pump suction conditions. As the percentage of gas increases above this level, pump performance deteriorates rapidly and a gas lock is likely to occur.

SUMMARY OF THE INVENTION

The present invention provides a rotary gas separator for separating a well fluid into a liquid and a gas. The separator includes a separating chamber, a well fluid inlet upstream of the separating chamber, and a liquid discharge outlet downstream of the separating chamber. A means is provided for recirculating a portion of the liquid discharged from the discharge outlet back to the separating chamber so that a gas-to-liquid ratio in the separator means is substantially lower than a gas-to-liquid ratio of well fluid entering the well fluid inlet.

The result of bypassing or recirculating a portion of the liquid exiting the separator is to reduce the gas-to-liquid ratio entering the separating chamber thus increasing the maximum gas-to-liquid ratio of the incoming well fluid which can be effectively processed by the separator without passing significant amounts of gas into the liquid stream exiting the separator. This increases the well fluid gas-to-liquid ratio which can be pumped by the submersible well pump with the recirculating gas separator.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 1 is an elevation, cross section partially schematic illustration of a typical prior art rotary gas separator.

FIG. 2 is an elevation section schematic illustration of an electric submersible well pump with the recirculating rotary gas separator of the present invention.

FIGS. 3A–3B comprise an elevation section partially schematic illustration of the submersible pump and recirculating gas separator of FIG. 2.

FIG. 4 is a horizontal cross-sectional view taken along line 4—4 of FIG. 3B.

FIG. 5 is a horizontal cross-sectional view taken along line 5—5 of FIG. 3A.

DETAILED DESCRIPTION OF THE PREFERRED EMBODIMENTS

Recognition of the Problem

Figure 6:
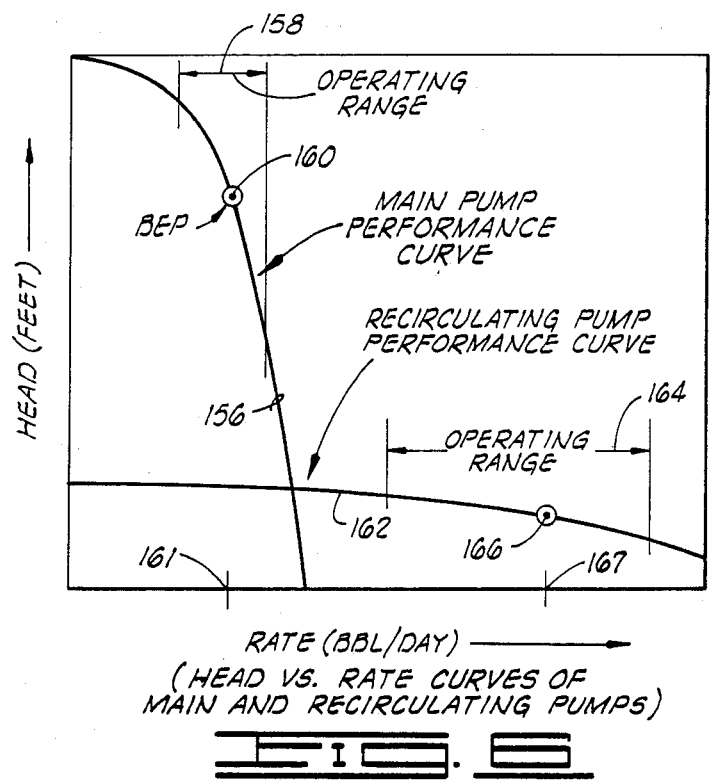
FIG. 6 is a graphical presentation of head versus rate curves for the electric submersible pump and the recirculating pump.

FIG. 1 illustrates a typical prior art rotary gas separator similar to that shown in U.S. Pat. No. 4,481,020 to Lee et al. The prior art separator is shown in an elevation cross-section view and is designated generally by the numeral 10. An electric submersible pump 12 is schematically illustrated in phantom lines above separator 10. A seal unit 14 and an electric motor 16 are schematically illustrated below the separator 10.

A drive shaft 18 extends from motor 16 upward through the separator 10 to the pump 12 for driving the separator 10 and the pump 12. It will be understood that the shaft 18 is actually a series of shaft segments splined together.

The separator 10 includes a plurality of well fluid inlets 20 which draw in well fluid, a charging section 22 which initiates generally axial upward flow of the well fluid, a separation section 24 in which a high energy vortex is developed thus separating the upward flowing well fluid into a generally centrally located gas stream and an annular generally radially outwardly located liquid stream, and a flow diverting section 26 which routes the centrifuged liquid through a passage 28 to a discharge outlet 30 communicated with pump 12, and which routes the separated gas from the central area of the separator to exit ports or vent ports 32.

I have determined that the limitations previously encountered with prior art centrifugal gas separators are due to physical constraints presented by the structure like that shown in FIG. 1. The velocities of the separated fluids in the upward axial direction within the separator 10 cannot be individually changed, and the separated gas and liquid streams must have approximately the same axial velocity component, other than for minor effects of buoyancy, viscosity and gas expansion. Therefore, the cross-sectional flow areas of the separated gas and liquid streams do not vary significantly with vertical position within the separation chamber, and are proportional to the volumetric percentages of the respective phases. As the percentage of gas becomes sufficiently large, its flow area will expand radially to the point that gas enters the annular flow area 34 of the flow diverting section 26 that is intended for liquid flow, and thus the gas will begin flowing through the passage 26 to the outlet 30 in unacceptable proportions.

The Solution to the Problem

I have determined a means for significantly increasing the volume percentage of gas in a well fluid stream which can be separated by a centrifugal separator without passing significant amounts of gas into the liquid stream directed to the submersible pump. This is accomplished by extracting a portion of the liquid stream exiting the separator, and blending that extracted portion of the liquid stream with well fluid entering the separator, thereby reducing a volume percentage of gas in the blended liquid entering the separation chamber.

My improved gas separator apparatus is shown schematically in FIG. 2, and in elevation partially sectioned detail in the enlarged view of FIGS. 3A and 3B. My gas separator apparatus, which can be referred to as a recirculating gas separator apparatus is generally designated by the numeral 36.

The recirculating gas separator apparatus 36 is shown schematically in FIG. 2 connected to an electric submersible pump 38 located within a well 40 defined by casing 42.

The recirculating gas separator 36 includes a rotary gas separator means 44 for separating liquid to be directed to pump 38 from gas. The separator means 44 is best shown in FIGS. 3A–3B, and includes a separating chamber 46, a plurality of well fluid inlets 48 located upstream of separating chamber 46, an annular liquid discharge outlet 50 located downstream of separating chamber 46, and a gas vent 52 located downstream of separating chamber 46 for venting gas into the well annulus 54 (see FIG. 2).

The recirculating gas separator apparatus 36 also includes a recirculating means 56 for recirculating a portion of the liquid discharged from discharge outlet 50 back to the separating chamber 46 so that a gas-to-liquid ratio in the separator means 44 is substantially lower than a gas-to-liquid ratio of well fluid entering the well fluid inlets 48.

The recirculating means 56 includes a recirculating pump means 58 for pumping liquid from the discharge outlet 50 to the submersible well pump 12.

The recirculating means 56 also includes a liquid extraction chamber means 60 for extracting a portion of the liquid discharged by the recirculating pump means 50 before said liquid reaches the submersible pump 12.

The recirculating means 56 further includes a liquid injection chamber means 62 for injecting said portion of said liquid into said separator means 44 upstream of the separating chamber 46.

The recirculating means additionally includes conduit means 64 for conducting said portion of said liquid from said liquid extraction chamber means 60 to said liquid injection chamber means 62.

The liquid injection chamber means 62 is preferably located upstream of the well fluid inlets 48 as shown in FIG. 3B, but could also function if located downstream of well fluid inlets 48.

The liquid extraction chamber means 60 is located above the recirculating pump means 58. The recirculating pump means 58 is located above the separator means 44. The separator means 44 is located above the liquid injection chamber means 62.

A drive motor 66 is located below the liquid injection chamber means 62, with a seal means 68 being located between the drive motor 66 and the liquid injection chamber means 62. The drive motor 66 has a drive shaft means 70 extending upward therefrom for driving the separator means 44, the recirculating pump means 58, and the submersible well pump 12. It will be understood that shaft means 70 will typically include a series of coupled shaft segments. The submersible well pump 12 pumps liquid upwardly through production tubing 72 to the earth's surface.

The separator means 44 includes a separator housing 74 having a generally cylindrical outer surface 76 best seen in FIG. 4. A possible form of the conduit means 64 includes a plurality of conduits 64A through 64F oriented generally parallel to a longitudinal axis 78 of housing 74 and secured against the cylindrical outer surface 76 by means of a band 80. An alternate conduit means could include one large flattened tube. The conduits 64A through 64F are surrounded by a conduit guard 82 at those locations where bands such as 80 are placed about the conduit 64A through 64F.

A motor extension lead 84 (see FIG. 4) is connected to the motor 66 and extends upward along the separator 36 and pump 12. Above pump 12 the lead 84 is splined to a round cable which extends along the production tubing 72 to the earth's surface where it is connected to a source of electrical power. The motor extension lead 84 is also secured against the cylindrical outer surface 76 of separator housing 74 by the bands such as 80. A flat cable guard 86 surrounds extension lead 84 at those locations where the bands 80 surround the extension lead 84.

As seen in FIG. 4, the conduits 64A through 64F are preferably located adjacent the motor extension lead 84 to maximize clearance of the recirculating gas separator apparatus 36 within the well casing 42.

The liquid extraction chamber means 60 includes a generally cylindrical extraction chamber housing 88 having an extraction chamber 90 defined therein. The housing 88 has a lower end 92 with an annular extraction chamber inlet means 94 defined therein for directing liquid which is pumped by recirculating pump means 58 from the liquid discharge outlet 50 of separator means 44 to the extraction chamber 90.

The extraction chamber housing 88 has an upper end 96 with an annular extraction chamber outlet means 98 defined therein for directing liquid from the extraction chamber 90 to the submersible well pump 12.

The extraction chamber housing 88 has an extraction port means 100 defined therein for extracting the portion of liquid flowing through extraction chamber 90 which is to be recirculated through conduit means 64.

The extraction chamber means 60 further includes a deflection means 102 extending into the extraction chamber 90 for deflecting said portion of said liquid toward the extraction port means 100. As best seen in FIG. 5, the deflection means 102 is a ledge which covers approximately one-half the circular cross-sectional area of the extraction chamber 90. A bore 104 through this ledge 102 contains a bearing means 106 for supporting the drive shaft 70 which extends downward from the submersible pump 12 through the extraction chamber means 90.

The liquid injection chamber means 62 includes a generally cylindrical injection chamber housing 108 having an injection chamber 110 defined therein.

The injection chamber housing 110 has an injection port means 112 defined therein for injecting said portion of said liquid which is recirculated through conduit means 64 into the injection chamber 110. The injection chamber housing 108 has an upper end 114 with an annular injection chamber outlet means 116 defined therein for directing said portion of said liquid from said injection chamber means 110 to the separator means 44.

The injection port means 112 is directed generally downwardly as seen in FIG. 3B. The liquid injection chamber means 62 further includes a deflection means 118 for deflecting liquid from the injection port means 112 generally upward into the injection chamber 110.

The deflection means 118 is constructed similar to the deflection means 102 of FIG. 5, and has a bore therethrough carrying a bearing means 120 for the shaft 70.

As seen in FIG. 3B, the separator housing 74 has a lower end 122 with a recirculation inlet means 124 defined therein for directing said portion of said liquid from said liquid injection chamber means 62 of said recirculating means 56 into said separation chamber 46.

The separator housing 74 is made up of an upper separator housing section 126, an intermediate separator housing section 128, and a lower separator housing section 130.

The well fluid inlets 48 are located in the lower separator housing section 130.

A spider support 132 is located in the lower end of intermediate separator housing section 128 and includes a plurality of spokes such as 134 extending inward to an annular collar 136 having a bore therein which carries a bearing 138 for the shaft 70.

As best seen in FIG. 4, between the spokes 134 there are three flow openings 140 to permit the upward flow of well fluid and recirculated liquid into the separation chamber 46.

In the separation chamber 46, a helical blade 142 which can be described as a charging means 142, initiates upward generally axial flow of well fluid and recirculated liquid.

Then, a plurality of straight radially oriented blades 144 which can also be described as a vortex generating means 144 generate a high energy vortex in the upward flowing fluid for thus separating the fluid radially into a centrally located gas stream and an annular radially outwardly located liquid stream.

The helical blade 142 and straight blades 144 are integrally constructed and are keyed to the shaft 70 so that they are rotated by the shaft 70 within the separator housing 74.

Then, an annular divider wall 146, which can be described as a flow diverting means 146, directs the annular liquid stream into an outer annular space 148, and directs the centrally located gas stream into a centrally located annular space 150 which flows around the shaft 70.

The liquid stream flows from outer space 148 through passages like 152 to the annular liquid discharge outlet 50 which leads to recirculating pump means 58. The centrally located annular space 150 leads the central gas stream through passages like 154 to gas vents 52.

It is noted that to simplify construction the liquid injection chamber means 62 and the separator means 44 could be combined into one unit having a common housing. Similarly, the recirculating pump means 58 and the liquid extraction chamber means 60 could be combined.

The recirculating pump means 58 pumps the liquid from the discharge outlet 50 of separator means 44 through the extraction chamber 90 to the submersible well pump 12. As previously mentioned, a portion of that liquid is extracted from extraction chamber 90 and recirculated through the recirculating conduit means 64.

Since the recirculating pump means 58 must pump all of the fluid which is ultimately pumped by the main electric submersible pump 12, plus all of the fluid which is recirculated, the recirculating pump means 58 should have a significantly higher flow rate at its operating point than does the submersible well pump 12 at its operating point.

The recirculating pump means 58 preferably is a centrifugal pump which may be composed of as few as one or two stages.

FIG. 6 is a graphical illustration of the head versus rate curves for the main submersible well pump 38 and for the recirculating pump 58. Curve 156 represents the performance curve for the main submersible well pump 38. As will be understood by those skilled in the art, a centrifugal pump has a curve like curve 156 along which the pump operates. As the discharge head against which the pump must pump increases, the flow rate at which the pump can pump fluid decreases. The main pump 38 will have a preferred operating range 158. Preferably the pump 38 will be operated at the point on curve 156 known as the best efficiency point (BEP) 160 having a corresponding flow rate 161.

Similarly, the recirculating pump means 58 will have an operating curve 162 with a preferred operating range 164. The recirculating pump means 58 should be chosen so that it operates at an operating point 166 somewhere within its preferred operating range 164 at a flow rate 167 substantially greater than the flow rate of the main pump 38 when main pump 38 is operating at its best efficiency point 160.

Figure 7:
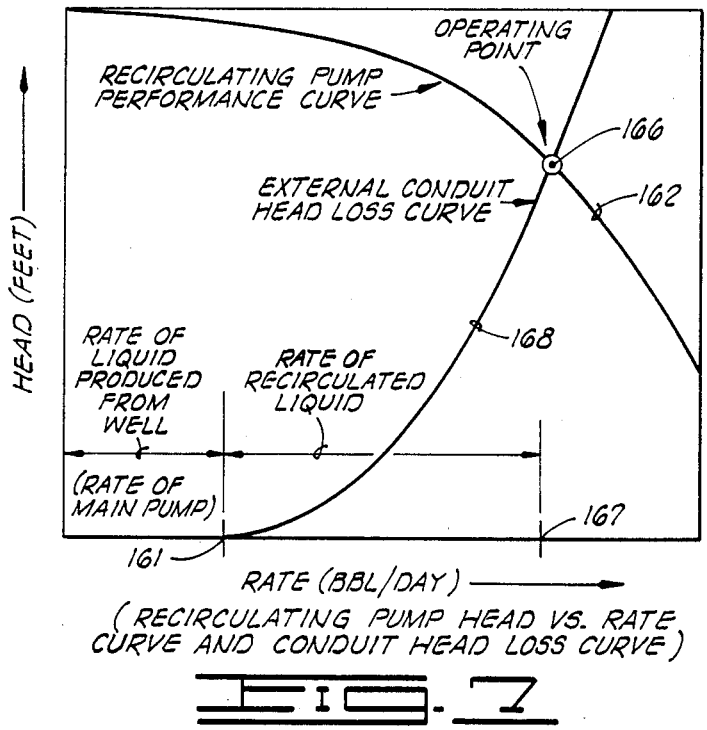
FIG. 7 is a graphical illustration of the head versus rate curve for the recirculating pump and the head loss versus rate curve of the external recirculating conduit.

In FIG. 7, the performance curve 162 of recirculating pump 58 has been reproduced to a different scale.

Also displayed in FIG. 7 is a curve 168 which represents the head loss through the fluid conduit means 64 for various flow rates.

The rate of recirculation of liquid through conduit means 64 equals the pumping rate 167 of the recirculating pump means 58 minus the pumping rate 161 of the main pump 38, and is governed by the head loss through the external recirculating conduit means 64.

At its operating point 160, the main pump 38 is operating at flow rate 161 noted on the horizontal axis in FIGS. 6 and 7. At its operating point 166, the recirculating pump means 58 is pumping at a flow rate 167 also indicated on the horizontal axis of FIGS. 6 and 7. It is noted that the scale of the vertical axis in FIG. 7 has been modified as compared to FIG. 6.

Flow data for one possible size, namely 0.5 inch diameter by 0.049 inch wall thickness, recirculating tube 64A is summarized in the following Table I. This data was calculated assuming an effective tube length of six feet. It may be observed that flow rates ranging from 150 to 336 barrels per day result in head losses ranging from ten to fifty feet. Rates much in excess of 336 barrels per day would probably be undesirable for the ½"×0.049" tubes because of erosional effects.

TABLE I
FLOW CHARACTERISTICS OF A SINGLE 0.50" × 0.049" TUBE OF 6' LENGTH

| Head Loss Feet | Velocity (Ft/Sec) | Flow (BBl/Day) | c* |
|---|---|---|---|
| 10 | 11.074 | 150.2 | 87.5 |
| 20 | 15.661 | 212.4 | 123.7 |
| 30 | 19.181 | 260.2 | 151.5 |
| 40 | 22.149 | 300.4 | 175.0 |
| 50 | 24.763 | 335.9 | 195.6 |

*Constant in the equation $v_e = c/\sqrt{\rho}$
from API RP 14E, API Recommended Practice for Design and Installation of Offshore Production Platform Piping Systems, 4th Edition API (April 15, 1984), page 22, paragraph 2.5(a).

For this particular size tube a flow rate of 300 barrels per day, resulting in a head loss of forty feet, would be a good design point. Thus, if approximately 1500 barrels per day is to be bypassed, a minimum of five tubes such as conduits 64A, 64B, etc., would be required. The actual operating point 166 of the recirculation pump 58 would be determined by the intersection of its head versus rate curve 62 with the conduit head loss versus rate curve 168 as illustrated in FIG. 7.

EXAMPLE

The result of bypassing liquid is to reduce the volume percent gas entering the rotary separation chamber 46, thus shifting the point at which separator efficiency begins a significant decrease and the point at which wells become unpumpable. This permits pumping higher gas/liquid ratio wells. The volume percent gas entering a conventional rotary gas separator (such as separator 10 of FIG. 1) and entering a recirculating gas separator (such as separator 36 of FIGS. 3A-3B) is expressed in Equations 1 and 2, respectively. One source for the formation volume factors used in these equations is Standing, M. B.: *Oilfield Hydrocarbon Systems*, Reinhold Publishing Corp., New York City (1952).

$$\% \text{ Gas} = \frac{(\beta_{2p} - \beta_o)100}{\beta_{2p} + WOR} \quad \text{Equation 1}$$

$$\% \text{ Gas} = \frac{(\beta_{2p} - \beta_o)100}{\beta_{2p} + WOR + (Q_r/Q_{os})} \quad \text{Equation 2}$$

where:
$\beta_o$ = Formation volume factor at pump inlet conditions of oil and dissolved gas (bbl. per bbl. of stock tank oil).
$\beta_{2p}$ = Formation volume factor at pump inlet conditions of oil, dissolved gas and free gas (bbl. per bbl. of stock tank oil).
WOR = Water Oil Ratio (bbl. produced water per bbl. of stock tank oil).
$Q_r$ = Rate of recirculation (bbl./day).
$Q_{os}$ = Oil producing rate of well (stock tank bbl./day).

In this example, assume the data shown in the following Table II as being representative of the well:

TABLE II

| | |
|---|---|
| Oil Gravity | 40° API |
| Gas Gravity | 0.9 |
| Producing BHP at Pump inlet | 600 psia |
| Water Cut 75% (WOR of 3) | |
| Bottom Hole Temperature 140° F. | |

In this example, it is assumed that the maximum volumetric percent gas that can be tolerated in the separation chamber of either the prior art separator 10, or the separation chamber 46 of separator 36 of the present invention is 65%. It is also assumed that the data presented in the above-cited reference, Standing, M. B.: *Oilfield Hydrocarbon Systems*, Reinhold Publishing Corp., New York City (1952) is valid for the well under consideration.

The problem then is to determine the maximum GOR and GLR at which the well can be produced with the conventional rotary gas separator 10 and with the recirculating gas separator 36 of the present invention, where:
GOR = Gas Oil Ratio (scf/bbl. of stock tank oil).
GLR = Gas Liquid Ratio (scf/bbl. of stock tank oil plus water).

It can be determined from Chart 3 of Standing, M. B.: *Oilfield Hydrocarbon Systems*, Reinhold Publishing Corp., New York City (1952), that $\beta_o$ equals 1.116. Then, setting Equation 1 equal to 65%, it can be determined that $\beta_{2p}$ equals 8.76. With this value, it is determined from Chart 1 of Standing, M. B.: *Oilfield Hydrocarbon Systems*, Reinhold Publishing Corp., New York City (1952), that GOR equals 2000 scf/bbl. Then, it can be determined that:

$$GLR = GOR/(WOR+1) = 500 \text{ SCF/bbl.} \quad \text{Equation 3}$$

Then, setting Equation 2 equal to 65% for the recirculating separator 36, we get the following Equation 4:

$$\% \text{ Gas} = \frac{(\beta_{2p} - \beta_o)100}{\beta_{2p} + WOR + (Q_r/Q_{os})} = 65 \quad \text{Equation 4}$$

Arbitrarily selecting a recirculating pump 58 which will provide a recirculating flow rate through conduit means 64 twice the bottom hole liquid producing rate of well fluid entering well fluid inlets 48, we have:

$$Q_r = 2 \; Q_{os}(\beta_o + WOR) \quad \text{Equation 5}$$

$$Q_r/Q_{os} = 2(\beta_o + WOR) \quad \text{Equation 6}$$

Substituting this expression for $Q_r/Q_{os}$ into Equation 4 reduces to:

$$\beta_{2p} = 24.05 \quad \text{Equation 7}$$

Then, from Chart 1 of Standing, M. B.: *Oilfield Hydrocarbon Systems*, Reinhold Publishing Corp., New York City (1952), we obtained GOR = 5400 scf/bbl. Then, we determine GLR for the recirculating separator means 36 as follows:

$$GLR = GOR/(WOR+1) = 1350 \text{ scf/bbl.} \quad \text{Equation 8}$$

The foregoing example illustrates the ability of the recirculating separator 36 to handle considerably larger volumes of gas than the conventional rotary gas separator 10. Selection of recirculating pump 58 having a recirculating flow rate through conduit means 64 twice the rate of production of well fluids into well fluid inlet 48 provided an increase in GLR from 500 scf/bbl. to 1350 scf/bbl. Selection of an even higher volume recirculating pump 58 would have further increased the gas handling capacity of the recirculating gas separator 36.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A gas separator apparatus for a submersible well pump, comprising:
   a rotary gas separator means for separating liquid to be directed to said pump from gas, said separator means including a separating chamber, a well fluid inlet upstream of said separating chamber, and a liquid discharge outlet downstream of said separating chamber; and
   recirculating means for recirculating a portion of the liquid discharged from said discharge outlet back to said separating chamber so that a gas-to-liquid ratio in said separator means is substantially lower than a gas-to-liquid ratio of well fluid entering said well fluid inlet wherein said recirculating means comprises:
   a recirculating pump means for pumping liquid from said discharge outlet to said submersible well pump;
   liquid extraction chamber means for extracting a portion of the liquid discharged by said recirculating pump means before said liquid reaches said submersible well pump;
   liquid injection chamber means for injecting said portion of said liquid into said separator means upstream of said separating chamber; and
   conduit means for conducting said portion of said liquid from said liquid extraction chamber means to said liquid injection chamber means.

2. The apparatus of claim 1, wherein:
   said liquid injection chamber means is located upstream of said well fluid inlet of said separator means.

3. The apparatus of claim 1, wherein:
   said liquid extraction chamber means is located above said recirculating pump means;
   said recirculating pump means is located above said separator means; and
   said separator means is located above said liquid injection chamber means.

4. The apparatus of claim 3, further comprising:
   a drive motor located below said liquid injection chamber means and having a drive shaft means extending upward therefrom, for driving said separator means, said recirculating pump means, and said submersible well pump.

5. The apparatus of claim 3, wherein:
   said separator means includes a housing having a generally cylindrical outer surface; and
   said conduit means includes a plurality of conduits oriented generally parallel to a longitudinal axis of said housing and secured against said cylindrical outer surface of said housing.

6. The apparatus of claim 5, further comprising:
   a drive motor located below said liquid injection chamber means and having a drive shaft means extending upward therefrom, for driving said separator means, said recirculating pump means, and said submersible well pump;
   a motor extension lead connected to said motor and secured against said cylindrical outer surface of said housing; and
   wherein said conduits are located adjacent said motor extension lead to maximize clearance of said gas separator apparatus within a well casing.

7. The apparatus of claim 1, wherein said liquid extraction chamber means comprises:
   a generally cylindrical extraction chamber housing having an extraction chamber defined therein, having a lower end with an extraction chamber inlet means defined therein for directing liquid from said liquid discharge outlet of said separator means to said extraction chamber, having an upper end with an extraction chamber outlet means defined therein for directing liquid from said extraction chamber to said submersible well pump, and having an extraction port means defined in said housing for extracting said portion of said liquid to be recirculated.

8. The apparatus of claim 7, wherein said extraction chamber means further comprises:
   deflection means extending into said extraction chamber for deflecting said portion of said liquid toward said extraction port means.

9. The apparatus of claim 7, wherein said extraction chamber means further comprises:
   bearing means for supporting a drive shaft extending downward from said submersible well pump through said extraction chamber means.

10. The apparatus of claim 1, wherein said liquid injection chamber means comprises:
    a generally cylindrical injection chamber housing having an injection chamber defined therein, having an injection port means defined in said housing for injecting said portion of said liquid into said injection chamber, and having an upper end with an injection chamber outlet means defined therein for directing said portion of said liquid from said injection chamber to said separator means.

11. The apparatus of claim 10, wherein:
    said injection port means is directed generally downwardly; and
    said liquid injection chamber means further includes deflection means for deflecting liquid from said injection port means generally upward into said injection chamber.

12. The apparatus of claim 10, wherein said injection chamber means further comprises:
    bearing means for supporting a drive shaft extending downward from said submersible well pump through said injection chamber means.

13. A gas separator apparatus for an electric, rotary, centrifugal, submersible well pump comprising:
    a rotary gas separator means for separating liquid to be directed to said pump from gas, said separator means including a separating chamber, a well fluid inlet upstream of said separating chamber, and a liquid discharge outlet downstream of said separating chamber; and recirculating means for recirculating a portion of a liquid discharge from said discharge outlet back to said separating chamber so that a gas-to-liquid ratio in said separator means is substantially lower than a gas-to-liquid ratio of well fluid entering said well fluid inlet wherein:

said separator means includes a housing having a lower end with a recirculation inlet means defined therein for directing said portion of said liquid from said recirculating means into said separating chamber, said recirculation inlet means being separate from said well fluid inlet whereby the recirculated liquid enters the housing separately from the well fluid.

14. The apparatus of claim 13, wherein said recirculating means further comprises:

a generally cylindrical extraction chamber housing having an extraction chamber defined therein, having a lower end with an extraction chamber inlet means defined therein for directing liquid from said liquid discharge outlet of said deparator means to said extraction chamber, having an upper end with an extraction chamber outlet means defined therein for directing liquid from said extraction chamber to said submersible well pump, and having an extraction port means defined in said housing for extracting said portion of said liquid to be recirculated.

15. The apparatus of claim 14 wherein said recirculating means further comprises:

deflection means extending into said extraction chamber for deflecting said portion of said liquid toward said extraction port means.

16. The apparatus of claim 13, wherein said recirculating means further comprises:

a generally cylindrical injection chamber housing having an injection chamber defined therein, having an injection port means defined in said housing for injecting said portion of said liquid into said injection chamber, and having an upper end with an injection chamber outlet means defined therein for directing said portion of said liquid from said injection chamber to said separator means.

17. The apparatus of claim 16, wherein:

said injection port means is directed generally downwardly; and said recirculating means further includes deflection means for deflecting liquid from said injection port means generally upward into said injection chamber.

18. The apparatus of claim 13, wherein: said separator means further includes a gas vent downstream of said separating chamber.

19. The apparatus of claim 13, wherein: said separator means is a rotary gas separator including:

a charging means for initiating upward generally axial flow of well fluid from said well fluid inlet;

vortex generating means for generating a high energy vortex in said upward flowing well fluid and for thus separating said well fluid radially into a centrally located gas stream and an annular radially outwardly located liquid stream; and flow diverting means for directing said liquid stream to said submersible well pump and for directing said gas stream to a vent to a annulus.

20. The apparatus of claim 13, wherein said recirculating means further comprises:

a recirculating pump means for pumping liquid from said discharge outlet to said submersible well pump.

21. The apparatus of claim 20, wherein:

said recirculating pump means has a significantly higher flow rate at its operating point than said submersible well pump has at its operating point.

22. A method of pumping liquid from a well producing well fluids having a relatively high gas-to-liquid ratio, comprising:

(a) centrifugally separating said well fluid into a liquid and a gas with a separator located downhole in said well;

(b) directing said separated liquid toward an inlet of a submersible well pump;

(c) recycling a portion of said separated liquid to said separator; and (d) providing an effective gas-to-liquid ratio in said separator substantially lower than a gas-to-liquid ratio of said well fluid prior to separation.

23. The method of claim 22, further comprising:

venting said separated gas into a well annulus.

24. The method of claim 22, wherein said step (a) further comprises:

(a)(1) initiating upward generally axial flow of well fluid in said separator;

(a)(2) generating a high energy vortex in said upward flowing well fluid; and (a)(3) separating said well fluid radially into a centrally located gas stream and an annular radially outwardly located liquid stream.

* * * * *